United States Patent
Park et al.

(10) Patent No.: US 8,045,709 B2
(45) Date of Patent: Oct. 25, 2011

(54) DIGITAL BROADCASTING CONDITIONAL ACCESS TERMINAL AND METHOD

(75) Inventors: Young-Sik Park, Deagu (KR); Seung-Chul Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 1052 days.

(21) Appl. No.: 11/542,861

(22) Filed: Oct. 4, 2006

(65) Prior Publication Data

US 2007/0121940 A1 May 31, 2007

(30) Foreign Application Priority Data

Oct. 4, 2005 (KR) .......................... 10-2005-0093085

(51) Int. Cl.
| | |
|---|---|
| H04N 7/167 | (2006.01) |
| H04K 1/00 | (2006.01) |
| H04L 29/06 | (2006.01) |
| H04L 9/32 | (2006.01) |
| G06F 11/30 | (2006.01) |
| G06F 17/30 | (2006.01) |
| G06F 15/167 | (2006.01) |
| G06F 15/16 | (2006.01) |

(52) U.S. Cl. ........ 380/239; 380/201; 380/212; 380/229; 380/233; 380/255; 713/150; 713/165; 713/168; 713/189; 726/26; 709/213; 709/219; 709/231; 709/232

(58) Field of Classification Search .................. 380/239, 380/201, 212, 229, 233, 255; 713/150, 165, 713/168, 189; 726/26; 709/213, 219, 231, 709/232
See application file for complete search history.

(56) References Cited

U.S. PATENT DOCUMENTS

| | | | | |
|---|---|---|---|---|
| 5,761,309 A | * | 6/1998 | Ohashi et al. | .................. 713/156 |
| 7,428,307 B2 | * | 9/2008 | Hori et al. | ..................... 380/277 |
| 2003/0005435 A1 | | 1/2003 | Nelger et al. | |
| 2004/0010472 A1 | * | 1/2004 | Hilby et al. | ..................... 705/67 |
| 2004/0068541 A1 | * | 4/2004 | Bayassi et al. | ................ 709/204 |
| 2004/0123330 A1 | | 6/2004 | Cho et al. | |
| 2004/0176086 A1 | * | 9/2004 | Chatterjee et al. | ............ 455/418 |
| 2005/0047448 A1 | * | 3/2005 | Lee et al. | ...................... 370/536 |
| 2005/0097327 A1 | * | 5/2005 | Ondet et al. | .................. 713/171 |
| 2005/0208957 A1 | * | 9/2005 | Knotts | ......................... 455/466 |
| 2007/0261076 A1 | * | 11/2007 | Puputti | ........................... 725/25 |
| 2010/0083300 A1 | * | 4/2010 | Lyou et al. | ...................... 725/27 |
| 2010/0107258 A1 | * | 4/2010 | Park et al. | ...................... 726/26 |
| 2010/0250388 A1 | * | 9/2010 | Lee | ................................ 705/26 |

FOREIGN PATENT DOCUMENTS

| | | |
|---|---|---|
| CN | 1558673 | 12/2004 |
| CN | 1571512 | 1/2005 |
| DE | 102 48 544 | 4/2004 |
| EP | 1 111 923 | 6/2001 |
| EP | 1 237 323 | 9/2002 |
| KR | 10-2004-0070491 | 8/2004 |

* cited by examiner

*Primary Examiner* — Aravind Moorthy
(74) *Attorney, Agent, or Firm* — The Farrell Law Firm, P.C.

(57) ABSTRACT

A mobile communication terminal for efficient digital broadcasting conditional access and a method of the mobile communication terminal. The mobile communication terminal includes a digital broadcasting receiver for receiving a scrambled digital broadcasting transport stream, a Subscriber Identify Module (SIM) card unit for generating a decoding key for descrambling the scrambled digital broadcasting transport stream, a multimedia unit for extracting from the scrambled digital broadcasting transport stream broadcasting viewing restriction information and broadcasting viewing entitlement information and descrambling the scrambled digital broadcasting transport stream using the decoding key generated by the smart card unit, and a controller for transmitting to the smart card unit the broadcasting viewing restriction information and broadcasting viewing entitlement information extracted by the multimedia unit in a digital broadcasting reception mode to control the smart card unit to generate the decoding key and transmitting the decoding key generated by the smart card unit to the multimedia unit.

32 Claims, 5 Drawing Sheets

DIGITAL BROADCASTING CONDITIONAL ACCESS TERMINAL AND METHOD

PRIORITY

This application claims priority under 35 U.S.C. §119 to an application filed in the Korean Intellectual Property Office on Oct. 4, 2005 and assigned Serial No. 2005-93085, the entire contents of which are incorporated herein by reference.

BACKGROUND OF THE INVENTION

1. Field of the Invention

The present invention generally relates to a mobile communication terminal having a smart card and being capable of receiving digital broadcasting, and in particular, to a digital broadcasting conditional access terminal and method for implementing a digital broadcasting Conditional Access System (CAS).

2. Description of the Related Art

A CAS indicates a system for authorizing an access to pay broadcasting services. A broadcasting station providing pay broadcasting services scrambles a broadcasting signal before transmission and a receiver descrambles the received broadcasting signal, thereby allowing only an authorized subscriber to enjoy the provided pay broadcasting services.

When a broadcasting station takes free broadcasting as a fundamental policy, the CAS cannot be used. However, when such a broadcasting station requires billing for some reasons (e.g., broadcasting subscription in shadow areas or subscription for contents requiring billing), an appropriate CAS should be implemented.

A mobile communication terminal equipped with a smart card has recently been developed, and user data and other data are stored in a flash memory of the smart card.

One of the representative uses of the smart card is to provide a roaming service of the mobile communication terminal with a mobile communication terminal user identity module embedded in the smart card. Examples of the mobile communication terminal user identity module include a Subscriber Identify-Module (SIM) card of a Universal Mobile Telecommunication System (UMTS), a Universal Subscriber Identity Module (USIM) of a Global System for Mobile Communications (GSM) system, and a User Identity Module (UIM) card, a Removal User Identity Module (RUIM) of a Code Division Multiple Access (CDMA) system, and a Surface Mount Device (SMD). The smart card having the mobile communication terminal user identity module embedded therein is basically used in a contact manner to share data with the mobile communication terminal.

For example, a GSM mobile communication terminal adopting European mobile communication standards uses the SIM card as the mobile communication terminal user identity module that serves as an interface between a mobile communication terminal and a network to deal with a situation, such as the replacement of the mobile communication terminal or the change of a common carrier. The SIM card has a processor and a memory chip mounted therein to store information for operation of the mobile communication terminal and includes user information and related information, such as telephone numbers and network numbers.

However, the mobile communication terminal having the smart card does not include a structure for implementing a digital broadcasting CAS, resulting in a need to consider a counterplan.

SUMMARY OF THE INVENTION

It is, therefore, an object of the present invention to provide a mobile communication terminal for efficient digital broadcasting conditional access and a method of the mobile communication terminal.

According to one aspect of the present invention, there is provided a mobile communication terminal including a digital broadcasting receiver, a smart card unit, a multimedia unit, and a controller. The digital broadcasting receiver receives a scrambled digital broadcasting transport stream. The smart card unit generates a decoding key for descrambling the scrambled digital broadcasting transport stream. The multimedia unit for extracting from the scrambled digital broadcasting transport stream broadcasting viewing restriction information and broadcasting viewing entitlement information, and descrambling the scrambled digital broadcasting transport stream using the decoding key generated by the smart card unit. The controller transmitting to the smart card unit the broadcasting viewing restriction information and broadcasting viewing entitlement information extracted by the multimedia unit in a digital broadcasting reception mode to control the smart card unit to generate the decoding key, and transmitting to the multimedia unit the decoding key generated by the smart key unit.

Preferably, the mobile communication terminal further includes a Radio Frequency (RF) transceiver for receiving broadcasting viewing entitlement information indicating whether a user of the mobile communication terminal is entitled to view digital broadcasting from a separate server.

More preferably, the mobile communication terminal further includes a key input unit through which digital broadcasting subscription is requested for receiving the broadcasting viewing entitlement information.

According to another aspect of the present invention, there is provided a mobile communication terminal having a smart card. The mobile communication terminal includes a digital broadcasting receiver, a decoding key generator, a multimedia unit, and a controller. The digital broadcasting receiver receives a scrambled digital broadcasting transport stream. The decoding key generator generates a decoding key for descrambling the scrambled digital broadcasting transport stream. The multimedia unit for extracting from the scrambled digital broadcasting transport stream broadcasting viewing restriction information and broadcasting viewing entitlement information, and descrambling the scrambled digital broadcasting transport stream using the decoding key generated by the decoding key generator. The controller transmitting to the decoding key generator the broadcasting viewing restriction information and broadcasting viewing entitlement information extracted by the multimedia unit in a digital broadcasting reception mode to control the decoding key generator to generate the decoding key, and transmitting to the multimedia unit the decoding key generated by the decoding key generator.

Preferably, the mobile communication terminal further includes an RF transceiver for receiving broadcasting viewing entitlement information indicating whether a user of the mobile communication terminal is entitled to view digital broadcasting from a separate server.

More preferably, the mobile communication terminal further includes a key input unit through which digital broadcasting subscription is requested for receiving the broadcasting viewing entitlement information.

According to further another aspect of the present invention, there is provided a digital broadcasting conditional access method of a mobile communication terminal. The digital broadcasting conditional access method includes transmitting to a separate server a request for a digital broadcasting subscription at the request of a user, receiving broadcasting viewing entitlement information from the server responding to the request and storing the received broadcasting viewing entitlement information, extracting broadcasting viewing restriction information and broadcasting viewing entitlement information included in the received digital broadcasting transport stream upon receiving a scrambled digital broadcasting transport stream in a digital broadcasting reception mode, generating a decoding key for descrambling the scrambled digital broadcasting transport stream using the extracted broadcasting viewing restriction information and the stored broadcasting viewing entitlement information, and descrambling the scrambled digital broadcasting transport stream using the generated decoding key.

Preferably, the digital broadcasting conditional access method further includes decoding and then outputting the descrambled digital broadcasting transport stream.

BRIEF DESCRIPTION OF THE DRAWINGS

The above and other objects, features, and advantages of embodiments of the present invention will be more apparent from the following description taken in conjunction with the accompanying drawings, in which.

DETAILED DESCRIPTION OF THE PREFERRED EMBODIMENT

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
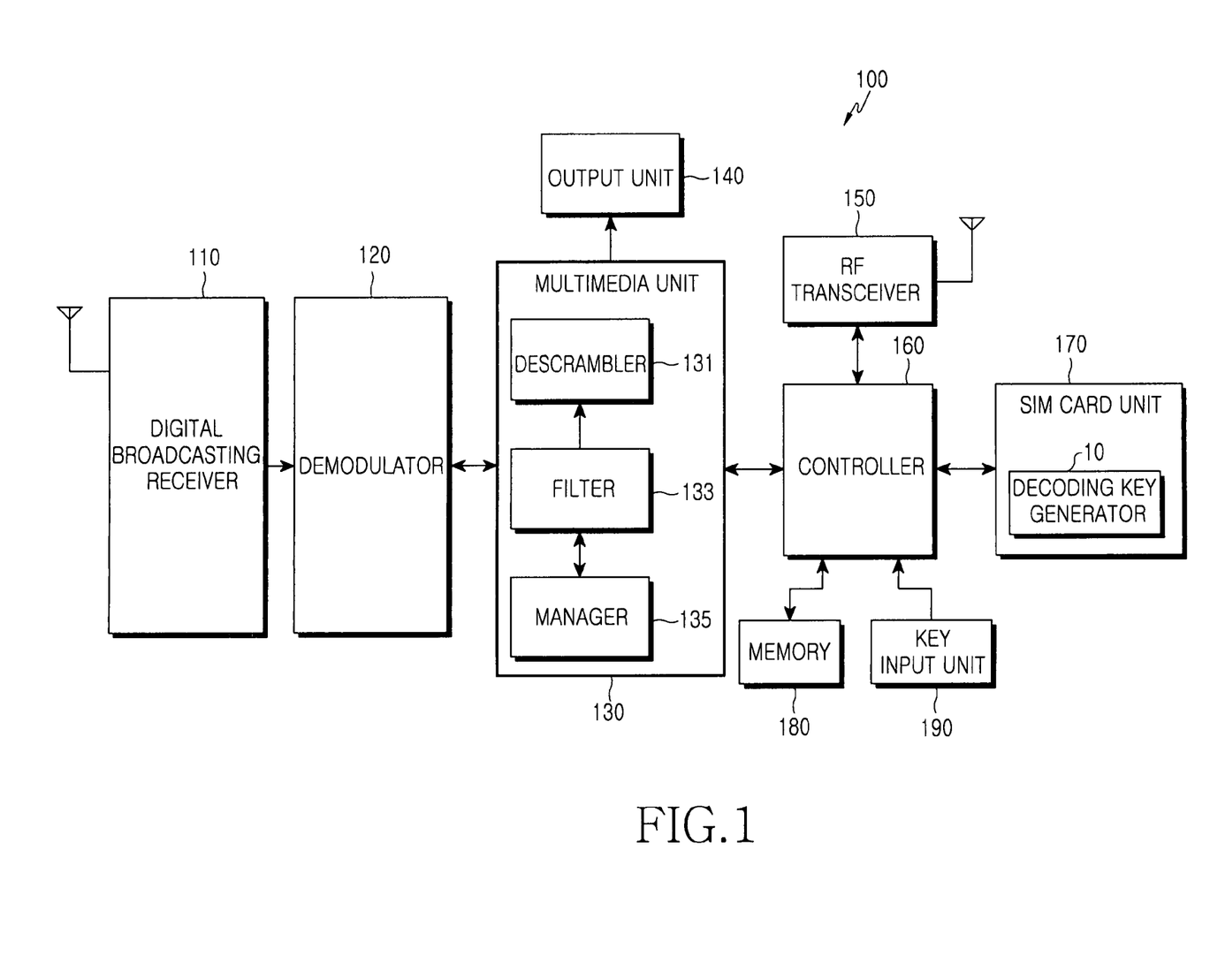
FIG. 1 is a block diagram of a mobile communication terminal according to a first embodiment of the present invention.

FIG. shows one example of a mobile communication terminal 100 according to the present invention. The mobile communication terminal 100 includes a digital broadcasting receiver 110, a demodulator 120, a multimedia unit 130, an output unit 140, a Radio Frequency (RF) transceiver 150, a controller 160, a smart card unit 170, a memory 180, and a key input unit 190.

The digital broadcasting receiver 110 receives a scrambled digital broadcasting signal and outputs the received digital broadcasting signal to the demodulator 120 under the control of the controller 160.

The demodulator 120 demodulates the digital broadcasting signal received from the digital broadcasting receiver 110 into a digital broadcasting transport stream and outputs the digital broadcasting transport stream to the multimedia unit 130.

If a user requests reception of digital broadcasting of a predetermined channel, the multimedia unit 130 sets a frequency of the digital broadcasting receiving unit 110 to a specific frequency of the predetermined channel under the control of the controller 160. Thus, the digital broadcasting receiver 110 can receive a digital broadcasting signal of the broadcasting channel desired by the user.

The multimedia unit 130 also demultiplexes the broadcasting signal demodulated into the digital broadcasting transport stream to divide the digital broadcasting transport stream into an audio data stream and a video data stream, decodes the audio data stream and the video data stream into an analog audio signal and an analog video signal, and then outputs the analog audio signal and the analog video signal through the output unit 140. The output unit 140 may indicate a speaker (not shown) and a display unit (not shown).

The multimedia unit 130 also extracts broadcasting viewing restriction information and broadcasting viewing entitlement information from the scrambled digital broadcasting transport stream under the control of the controller 160. The broadcasting viewing restriction information means an Entitlement Control Message (ECM) including broadcasting channel-based reception entitlement information and a decoding key (Control Word (CW)). The broadcasting viewing entitlement information indicates an Entitlement Management Message (EMM) including a second key for decrypting the broadcasting viewing restriction information and subscriber-based viewing entitlement information. The broadcasting viewing entitlement information may include a first key for decrypting the broadcasting viewing entitlement information and the first key is used for updating broadcasting viewing entitlement information stored in the smart card unit 170.

The multimedia unit 130 searches sub-channels of the digital broadcasting transport stream to extract broadcasting viewing entitlement information and broadcasting viewing restriction information included in a predetermined sub-channel. In other words, in the case of terrestrial digital broadcasting, a broadcasting frame includes a Main Service Channel (MSC) including broadcasting data and a Fast Information Channel (FIC) indicating information of the MSC. The MSC includes multiple sub-channels (e.g., 0-63 sub-channels) including video, audio, and data channels. Since the broadcasting viewing entitlement information and the broadcasting viewing restriction information are included in the FIC or a predetermined sub-channel (e.g., a $64^{th}$ sub-channel) among the 64 sub-channels for transmission, the multimedia unit 130 can extract the broadcasting viewing entitlement information and the broadcasting viewing restriction information by checking the FIC or the predetermined sub-channel of the scrambled digital broadcasting transport stream.

The multimedia unit 130 descrambles the scrambled digital broadcasting transport stream using a decoding key generated by the smart card unit 170. The decoding key (CW) means a password for descrambling the scrambled digital broadcasting transport stream.

To this end, the multimedia unit 130 includes a descrambler 131, a filter 133, and a manager 135.

The descrambler 131 descrambles the scrambled digital broadcasting transport stream using the decoding key, and the descrambled digital broadcasting transport stream is decoded by a decoder (not shown) and then output to the output unit 140.

The filter 133 extracts, i.e., filters only broadcasting viewing restriction information and broadcasting viewing entitlement information corresponding to the mobile communication terminal 100 from the broadcasting viewing restriction information and broadcasting viewing entitlement information included in the scrambled digital broadcasting transport stream and transmits the same to the manager 135. The broadcasting viewing restriction information and broadcasting viewing entitlement information corresponding to the mobile communication terminal 100 are received at predetermined intervals. In other words, the broadcasting viewing restriction information is received at intervals of a first time (e.g., five seconds) as being included in the digital broadcasting transport stream and the broadcasting viewing entitlement information is received at intervals of a second time (e.g., thirty seconds) longer than the first time as being included in the digital broadcasting transport stream.

The manager 135 transmits the extracted broadcasting viewing restriction information and broadcasting viewing entitlement information to the smart card unit 170 under the control of the controller 160. The manager 135 receives the decoding key generated by the smart card unit 170 and transmits the same to the descrambler 131.

To reduce power consumption of the mobile communication terminal 100, it is preferable that the manager 135 simultaneously transmit the broadcasting viewing restriction information received at intervals of the first time and the broadcasting viewing entitlement information received at intervals of the second time to the smart card unit 170. To this end, the manager 135 may include a buffer.

The RF transceiver 150 has functions of a high-frequency processor, an intermediate-frequency processor, and a baseband processor. The RF transceiver 150 transmits and receives voice data, character data, video data, and control data under the control of the controller 160.

The RF transceiver 150 receives the broadcasting viewing entitlement information indicating whether the user of the mobile communication terminal 100 is entitled to view digital broadcasting of digital broadcasting channels from a separate server. The received broadcasting viewing entitlement information may include the first key for decrypting the broadcasting viewing entitlement information included in the scrambled digital broadcasting transport stream. The first key may be stored in the smart card unit 170 when a SIM card of the smart card unit 170 is used only for digital broadcasting reception.

In the present invention, the server may be an Over-The-Air activation (OTA) server and the broadcasting viewing entitlement information may be received as being included in a data region of an OTA message. The structure of an OTA message is well known and a description will not be given.

The received broadcasting viewing entitlement information is stored in the smart card unit 170 or the memory 180 under the control of the controller 160.

If the user requests subscription for digital broadcasting through the key input unit 190, the RF transceiver 150 transmits subscriber information to the server using a Short Message Service (SMS) message or the wireless Internet under the control of the controller 160.

The controller 160 controls overall operations of the mobile communication terminal 100 according to the present invention. If the user requests a subscription for digital broadcasting, the controller 160 controls the RF transceiver 150 to transmit a request for digital broadcasting subscription of the mobile communication terminal 100 to an OTA server (not shown) using an SMS message or the wireless Internet. The request for digital broadcasting subscription may also be transmitted through a phone or the wired Internet. The controller 160 transmits subscriber information of the mobile communication terminal 100 to the OTA server, and the OTA server authenticates the subscriber information and transmits broadcasting viewing entitlement information to the mobile communication terminal 100. If the user requests cancellation of subscription for digital broadcasting through the key input unit 190, the controller 190 may control the RF transceiver 150 to transmit a cancellation request to the OTA server using an SMS message or the wireless Internet.

The controller 160 transmits the broadcasting viewing restriction information and the broadcasting viewing entitlement information extracted from the scrambled digital broadcasting transport stream by the multimedia unit 130 in a digital broadcasting reception mode to the smart card unit 170 to control the smart card unit 170 to generate the decoding key.

The controller 160 also transmits the decoding key generated by the smart card unit 170 to the multimedia unit 130.

The smart card unit 170 stores the broadcasting viewing entitlement information received through the RF transceiver 150 through a smart card interface unit (not shown) providing an interface with the mobile communication terminal 100. In an embodiment of the present invention, the smart card unit 170 is implemented with a SIM card. The smart card unit 170 generates the decoding key (CW) for descrambling the scrambled digital broadcasting transport stream.

In other words, upon receiving the broadcasting viewing restriction information and the broadcasting viewing entitlement information extracted by the multimedia unit 130, the smart card unit 170 decrypts the extracted broadcasting viewing entitlement information using a previously stored first key to extract the second key for decrypting the broadcasting viewing restriction information and subscriber-based viewing entitlement information. When a new first key is included in the decrypted broadcasting viewing entitlement information, the smart card unit 170 updates the previously stored first key with the new first key. To update the first key means to renew the entitlement of digital broadcasting subscription for security. In other words, even when a user's digital broadcasting subscription period is one month, a first key received as being included in the digital broadcasting transport stream from the OTA server at the time of digital broadcasting subscription is not used for one month, but is updated at predetermined intervals (e.g., every weeks) through received broadcasting viewing entitlement information included in the digital broadcasting transport stream, thereby improving security. Thus, it is preferable that broadcasting viewing entitlement information initially stored in the smart card unit 170 include a first key that can be used, e.g., for a week, and the first key be updated every weeks through received broadcasting viewing entitlement information included in the digital broadcasting transport stream.

The smart card unit 170 extracts the decoding key and channel-based reception entitlement information by decrypting broadcasting viewing restriction information using the extracted second key.

The smart card unit 170 compares the extracted subscriber-based viewing entitlement information with channel-based reception entitlement information. If the user of the mobile communication terminal 100 is an authorized subscriber, the smart card unit 170 outputs the decoding key to the multimedia unit 130 under the control of the controller 160.

The smart card unit 170 updates previously stored broadcasting viewing entitlement information using the extracted broadcasting viewing entitlement information and may include a decoding key generator 10 for generating the decoding key using the extracted broadcasting viewing restriction information and the updated broadcasting viewing entitlement information. The smart card unit 170 may vary with a communication system. For example, the smart card unit 170 may be USIM card for a UMTS or a UIM card or a RUIM card for a CDMA system. The smart card unit 170 may also be a Surface Mount Device (SMD) implemented as a separate hardware chip.

When the smart card of the smart card unit 170 is a prepaid SIM card including a decoding key that is available only for a specific period, the mobile communication terminal 100 may allow the user to use only limited contents (e.g., contents of limited genres or categories) using the prepaid SIM card.

The memory 180 stores information for control of the operation of the mobile communication terminal 100 according to the present invention. The memory 180 may also store broadcasting viewing entitlement information under the control of the controller 160.

The key input unit 190 may include character keys, number keys, and function keys and outputs a key input signal corresponding to a key input by the user to the controller 160. Thus, the user may request digital broadcasting subscription or cancellation thereof for receiving the broadcasting viewing entitlement information through the key input unit 180.

Figure 2:
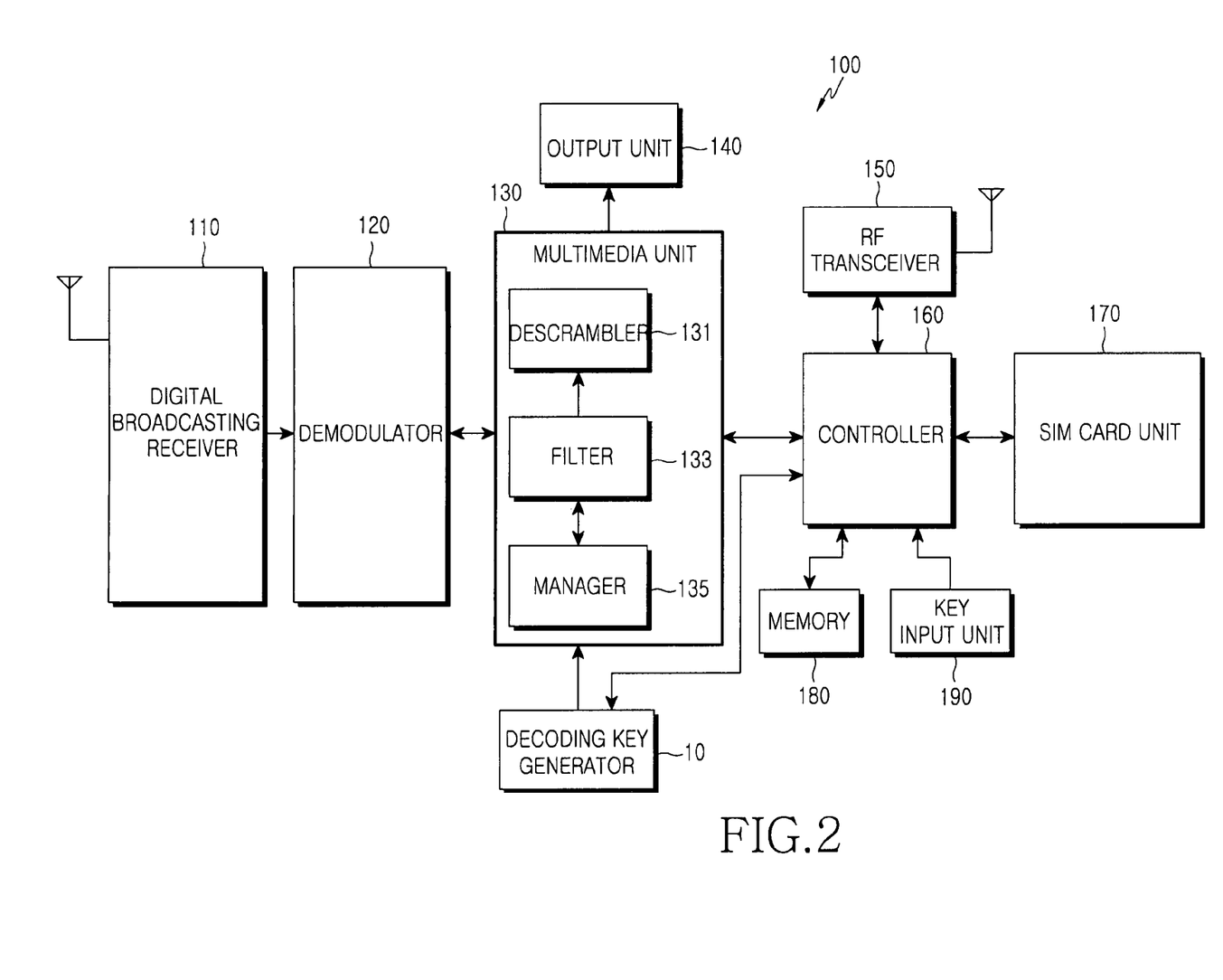
FIG. 2 is a block diagram of a mobile communication terminal according to a second embodiment of the present invention.

FIG. 2 shows another example of a mobile communication terminal 100 according to the present invention. The mobile communication terminal 100 includes a digital broadcasting receiver 110, a decoding key generator 10, a demodulator 120, a multimedia unit 130, an output unit 140, an RF transceiver 150, a controller 160, a smart card unit 170, a memory 180, and a key input unit 190.

The digital broadcasting receiver 110 receives a scrambled digital broadcasting signal and outputs the received digital broadcasting signal to the demodulator 120 under the control of the controller 160.

The demodulator 120 demodulates the digital broadcasting signal received from the digital broadcasting receiver 110 into a digital broadcasting transport stream and outputs the digital broadcasting transport stream to the multimedia unit 130.

The decoding key generator 10 generates a decoding key for descrambling the scrambled digital broadcasting transport stream. The decoding key generator 10 may be implemented with a smart card fixed as a hardware chip.

The multimedia unit 130 demultiplexes the broadcasting signal demodulated into the digital broadcasting transport stream to divide the digital broadcasting transport stream into an audio data stream and a video data stream, and then outputs the audio data stream and the video data stream through the output unit 140.

The multimedia unit 130 also extracts broadcasting viewing restriction information and broadcasting viewing entitlement information from the scrambled digital broadcasting transport stream under the control of the controller 160.

The multimedia unit 130 descrambles the scrambled digital broadcasting transport stream using the decoding key generated by the decoding key generator 10.

To this end, the multimedia unit 130 includes a descrambler 131, a filter 133, and a manager 135.

The descrambler 131 descrambles the scrambled digital broadcasting transport stream using the decoding key generated by the decoding key generator 10, and the descrambled digital broadcasting transport stream is decoded by a decoder (not shown) and then output to the output unit 140.

The filter 133 extracts, i.e., filters only broadcasting viewing restriction information and broadcasting viewing entitlement information corresponding to the mobile communication terminal 100 from the broadcasting viewing restriction information and broadcasting viewing entitlement information included in the scrambled digital broadcasting transport stream and transmits the same to the manager 135. The broadcasting viewing restriction information is received at intervals of a first time (e.g., five seconds) as being included in the digital broadcasting transport stream and the broadcasting viewing entitlement information is received at intervals of a second time (e.g., thirty seconds) longer than the first time as being included in the digital broadcasting transport stream.

The manager 135 transmits the extracted broadcasting viewing restriction information and broadcasting viewing entitlement information to the decoding key generator 10 under the control of the controller 160. The manager 135 receives the decoding key generated by the decoding key generator 10 and transmits the same to the descrambler 131.

To reduce power consumption of the mobile communication terminal 100, it is preferable that the manager 135 simultaneously transmit the broadcasting viewing restriction information received at intervals of the first time and the broadcasting viewing entitlement information received at intervals of the second time to the smart card unit 170. To this end, the manager 135 may include a buffer.

The RF transceiver 150 receives the broadcasting viewing entitlement information indicating whether the user of the mobile communication terminal 100 is entitled to view digital broadcasting of digital broadcasting channels from a separate server (e.g., an OTA server).

The received broadcasting viewing entitlement information is stored in the smart card unit 170 under the control of the controller 160. When the mobile communication terminal 100 does not include a smart card, the received broadcasting viewing entitlement information may be stored in the memory 180.

If the user requests subscription for digital broadcasting through the key input unit 190, the RF transceiver 150 transmits a request for digital broadcasting subscription to the server using an SMS message or the wireless Internet under the control of the controller 160. To this end, it is preferable that the controller 160 transmits user information to the server.

The controller 160 controls overall operations of the mobile communication terminal 100 according to the present invention. If the user requests subscription for digital broadcasting, the controller 160 controls the RF transceiver 150 to transmit a request for digital broadcasting subscription of the mobile communication terminal 100 to an OTA server (not shown) using an SMS message or the wireless Internet. The controller 160 transmits subscriber information of the mobile communication terminal 100 to the OTA server, and the OTA server authenticates the subscriber information and transmits broadcasting viewing entitlement information to the mobile communication terminal 100 using an OTA message.

The controller 160 transmits the broadcasting viewing restriction information and the broadcasting viewing entitlement information extracted from the scrambled digital broadcasting transport stream by the multimedia unit 130 in a digital broadcasting reception mode to the decoding key generator 10 to control the decoding key generator 10 to generate the decoding key. It is preferable that the controller 160 transmit broadcasting viewing entitlement information stored in the smart card unit 170 or the memory 180 to the decoding key generator 10. The decoding key generator 10 then updates the broadcasting viewing entitlement information stored in the smart card unit 170 or the memory 180 using the broadcasting viewing entitlement information extracted by the multimedia unit 130 and generates the decoding key using the extracted broadcasting viewing restriction information and the updated broadcasting viewing entitlement information. The decoding key generator 10 may be included in the demodulator 120. The detailed operation of the decoding key generator 10 is already described with reference to FIG. 1 and a description will not be given.

The controller 160 transmits the generated decoding key to the multimedia unit 130.

The smart card unit 170 stores the broadcasting viewing entitlement information received through the RF transceiver 150 through a smart card interface unit (not shown) providing an interface with the mobile communication terminal 100.

The memory 180 stores information for control of the operation of the mobile communication terminal 100 according to the present invention. When the mobile communication terminal 100 does not include the smart card unit 170, the memory 180 may also store broadcasting viewing entitlement information under the control of the controller 160.

The key input unit 190 may include character keys, number keys, and function keys and outputs a key input signal corresponding to a key input by the user to the controller 160. Thus, the user may request digital broadcasting subscription or cancellation thereof for receiving the broadcasting viewing entitlement information through the key input unit 180.

Figure 3:
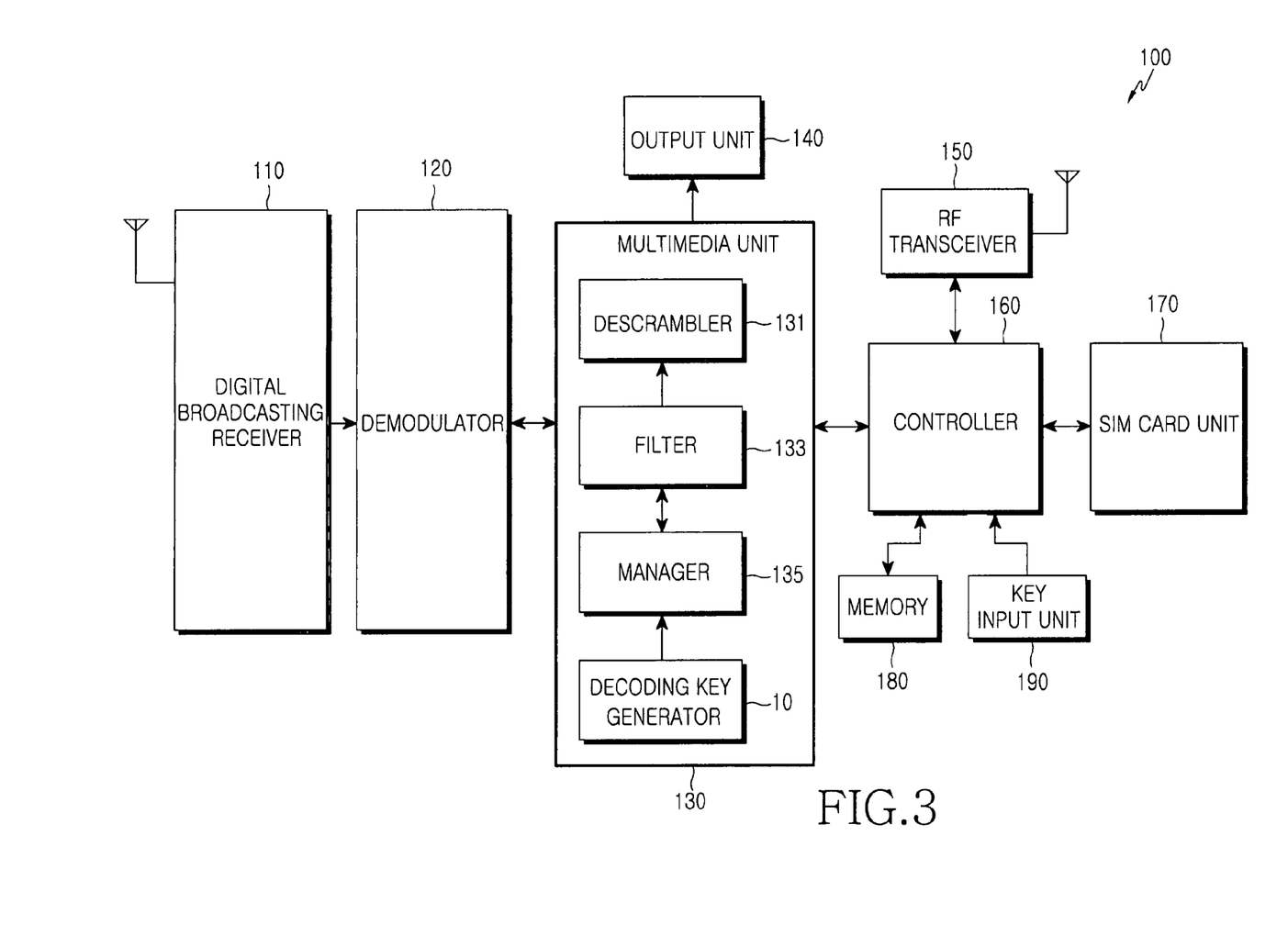
FIG. 3 is a block diagram of a mobile communication terminal according to a third embodiment of the present invention.

FIG. 3 shows another example of a mobile communication terminal 100 according to the present invention. The mobile communication terminal 100 includes a digital broadcasting receiver 110, a demodulator 120, a multimedia unit 130, an output unit 140, an RF transceiver 150, a controller 160, a smart card unit 170, a memory 180, and a key input unit 190.

The digital broadcasting receiver 110 receives a scrambled digital broadcasting signal and outputs the received digital broadcasting signal to the demodulator 120 under the control of the controller 160.

The demodulator 120 demodulates the digital broadcasting signal received from the digital broadcasting receiver 110 into a digital broadcasting transport stream and outputs the digital broadcasting transport stream to the multimedia unit 130.

The multimedia unit 130 demultiplexes the broadcasting signal demodulated into the digital broadcasting transport stream to divide the digital broadcasting transport stream into an audio data stream and a video data stream, decodes the audio data stream and the video data stream into an analog audio signal and an analog video signal, and then outputs the analog audio signal and the analog video signal through the output unit 140.

The multimedia unit 130 also generates a decoding key for descrambling the scrambled digital broadcasting transport stream and descrambles the scrambled digital broadcasting transport stream using the generated decoding key.

To this end, the multimedia unit 130 includes a descrambler 131, a filter 133, a manager 135, and a decoding key generator 10.

The descrambler 131 descrambles the scrambled digital broadcasting transport stream using the decoding key generated by the decoding key generator 10, and the descrambled digital broadcasting transport stream is decoded by a decoder (not shown) and then output to the output unit 140.

The filter 133 extracts, i.e., filters only broadcasting viewing restriction information and broadcasting viewing entitlement information corresponding to the mobile communication terminal 100 from the broadcasting viewing restriction information and broadcasting viewing entitlement information included in the scrambled digital broadcasting transport stream and transmits the same to the manager 135. The broadcasting viewing restriction information is received at intervals of a first time (e.g., five seconds) as being included in the digital broadcasting transport stream and the broadcasting viewing entitlement information is received at intervals of a second time (e.g., thirty seconds) longer than the first time as being included in the digital broadcasting transport stream.

The manager 135 transmits the extracted broadcasting viewing restriction information and broadcasting viewing entitlement information to the decoding key generator 10. The manager 135 receives the decoding key generated by the decoding key generator 10 and transmits the same to the descrambler 131.

The decoding key generator 10 generates and outputs the decoding key for descrambling the scrambled digital broadcasting transport stream.

To reduce power consumption of the mobile communication terminal 100, it is preferable that the manager 135 simultaneously transmit the broadcasting viewing restriction information received at intervals of the first time and the broadcasting viewing entitlement information received at intervals of the second time to the decoding key generator 10. To this end, the manager 135 may include a buffer.

The RF transceiver 150 receives the broadcasting viewing entitlement information indicating whether the user of the mobile communication terminal 100 is entitled to view digital broadcasting of digital broadcasting channels from a separate server (e.g., an OTA server).

The received broadcasting viewing entitlement information is stored in the smart card unit 170 or the memory 180 under the control of the controller 160.

If the user requests a subscription for digital broadcasting through the key input unit 190, the RF transceiver 150 transmits a request for digital broadcasting subscription to the server using an SMS message or the wireless Internet under the control of the controller 160. To this end, it is preferable that the controller 160 transmits user information to the server.

The controller 160 controls overall operations of the mobile communication terminal 100 according to the present invention. If the user requests subscription for digital broadcasting, the controller 160 controls the RF transceiver 150 to transmit a request for digital broadcasting subscription of the mobile communication terminal 100 to an OTA server (not shown) using an SMS message or the wireless Internet. The controller 160 transmits subscriber information of the mobile communication terminal 100 to the OTA server, and the OTA server authenticates the subscriber information and transmits broadcasting viewing entitlement information to the mobile communication terminal 100.

The controller 160 transmits the broadcasting viewing restriction information and the broadcasting viewing entitlement information extracted from the scrambled digital broadcasting transport stream by the multimedia unit 130, i.e., the filter 133, in a digital broadcasting reception mode to the decoding key generator 10 to control the decoding key generator 10 to generate the decoding key. It is preferable that the controller 160 transmits broadcasting viewing entitlement information stored in the smart card unit 170 or the memory 180 to the decoding key generator 10 of the multimedia unit 130. The decoding key generator 10 then updates the received broadcasting viewing entitlement information using the broadcasting viewing entitlement information extracted by the filter 133 of the multimedia unit 130 and generates the decoding key using the extracted broadcasting viewing restriction information and the updated broadcasting viewing entitlement information. The detailed operation of the decoding key generator 10 is already described with reference to FIG. 1 and a description will not be given.

The smart card unit 170 stores the broadcasting viewing entitlement information received through the RF transceiver 150 through a smart card interface unit (not shown) providing an interface with the mobile communication terminal 100.

The memory 180 stores information for control of the operation of the mobile communication terminal 100 according to the present invention. The memory 180 may also store broadcasting viewing entitlement information under the control of the controller 160.

The key input unit 190 may include character keys, number keys, and function keys and outputs a key input signal corresponding to a key input by the user to the controller 160. Thus, the user may request digital broadcasting subscription or cancellation thereof for receiving the broadcasting viewing entitlement information through the key input unit 180.

Figure 4:
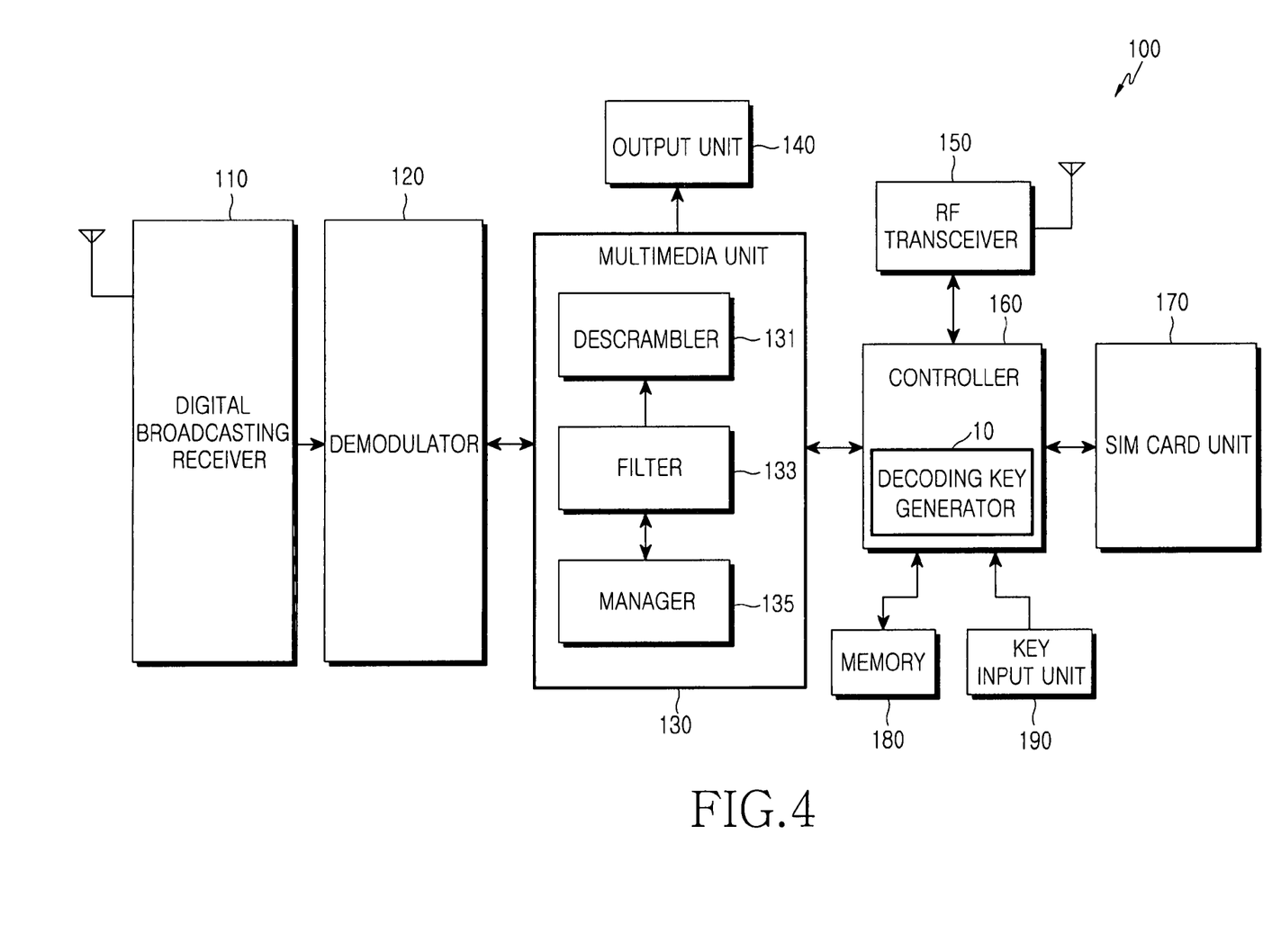
FIG. 4 is a block diagram of a mobile communication terminal according to a fourth embodiment of the present invention.

FIG. 4 shows another example of a mobile communication terminal 100 according to the present invention. The mobile communication terminal 100 includes a digital broadcasting receiver 110, a demodulator 120, a multimedia unit 130, an output unit 140, an RF transceiver 150, a controller 160, a smart card unit 170, a memory 180, and a key input unit 190.

The digital broadcasting receiver 110 receives a scrambled digital broadcasting signal and outputs the received digital broadcasting signal to the demodulator 120 under the control of the controller 160.

The demodulator 120 demodulates the digital broadcasting signal received from the digital broadcasting receiver 110 into a digital broadcasting transport stream and outputs the digital broadcasting transport stream to the multimedia unit 130.

The multimedia unit 130 demultiplexes the broadcasting signal demodulated into the digital broadcasting transport stream to divide the digital broadcasting transport stream into an audio data stream- and a video data stream, decodes the audio data stream and the video data stream into an analog audio signal and an analog video signal, and then outputs the analog audio signal and the analog video signal through the output unit 140.

The multimedia unit 130 also extracts broadcasting viewing restriction information and broadcasting viewing entitlement information from the scrambled digital broadcasting transport stream under the control of the controller 160.

The multimedia unit 130 descrambles the scrambled digital broadcasting transport stream using a decoding key generated by the controller 160.

To this end, the multimedia unit 130 includes a descrambler 131, a filter 133, and a manager 135.

The descrambler 131 descrambles the scrambled digital broadcasting transport stream using the decoding key generated by the controller 160, and the descrambled digital broadcasting transport stream is decoded by a decoder (not shown) and then output to the output unit 140.

The filter 133 extracts, i.e., filters only broadcasting viewing restriction information and broadcasting viewing entitlement information corresponding to the mobile communication terminal 100 from the broadcasting viewing restriction information and broadcasting viewing entitlement information included in the scrambled digital broadcasting transport stream and transmits the same to the manager 135. The broadcasting viewing restriction information is received at intervals of a first time (e.g., five seconds) as being included in the digital broadcasting transport stream and the broadcasting viewing entitlement information is received at intervals of a second time (e.g., thirty seconds) longer than the first time as being included in the digital broadcasting transport stream.

The manager 135 transmits the extracted broadcasting viewing restriction information and broadcasting viewing entitlement information to the controller 160. The manager 135 receives the decoding key generated by the controller 160 and transmits the same to the descrambler 131.

To reduce power consumption of the mobile communication terminal 100, it is preferable that the manager 135 simultaneously transmit the broadcasting viewing restriction information received at intervals of the first time and the broadcasting viewing entitlement information received at intervals of the second time to the controller 160. To this end, the manager 135 may include a buffer.

The RF transceiver 150 receives the broadcasting viewing entitlement information indicating whether the user of the mobile communication terminal 100 is entitled to view digital broadcasting of digital broadcasting channels from a separate server (e.g., an OTA server).

The received broadcasting viewing entitlement information is stored in the smart card unit 170 or the memory 180 under the control of the controller 160.

If the user requests subscription for digital broadcasting through the key input unit 190, the RF transceiver 150 transmits a request for digital broadcasting subscription to the server using an SMS message or the wireless Internet under the control of the controller 160. To this end, it is preferable that the controller 160 transmits user information to the server.

The controller 160 controls overall operations of the mobile communication terminal 100 according to the present invention. If the user requests a subscription for digital broadcasting, the controller 160 controls the RF transceiver 150 to transmit a request for digital broadcasting subscription of the mobile communication terminal 100 to an OTA server (not shown) using an SMS message or the wireless Internet. The controller 160 transmits subscriber information of the mobile communication terminal 100 to the OTA server, and the OTA server authenticates the subscriber information and transmits broadcasting viewing entitlement information to the mobile communication terminal 100.

The controller 160 may include the decoding key generator 10 for generating a decoding key using the broadcasting viewing restriction information and the broadcasting viewing entitlement information extracted from the scrambled digital broadcasting transport stream by the multimedia unit 130, i.e., the filter 133, in a digital broadcasting reception mode. The detailed operation of the decoding key generator 10 is already described with reference to FIG. 1 and a description will not be given.

In other words, the controller 160 updates broadcasting viewing entitlement information stored in the smart card unit 170 or the memory 180 using the broadcasting viewing entitlement information extracted by the filter 133 of the multimedia unit 130 and generates the decoding key using the extracted broadcasting viewing restriction information and the updated broadcasting viewing entitlement information.

The smart card unit 170 stores the broadcasting viewing entitlement information received through the RF transceiver 150 through a smart card interface unit (not shown) providing an interface with the mobile communication terminal 100.

The memory 180 stores information for control of the operation of the mobile communication terminal 100 according to the present invention. The memory 180 may also store broadcasting viewing entitlement information under the control of the controller 160.

The key input unit 190 may include character keys, number keys, and function keys and outputs a key input signal corresponding to a key input by the user to the controller 160. Thus, the user may request digital broadcasting subscription or cancellation thereof for receiving the broadcasting viewing entitlement information through the key input unit 180.

Although the multimedia unit 130 includes the descrambler 131, the filter 133, and the manager 135 in the first through fourth embodiments of the present invention, the descrambler 131, the filter 133, and the manger 135 may also be included in the demodulator 120 or the controller 160.

In addition, while the mobile communication terminal 100 separately includes the multimedia unit 130 in the foregoing description, the multimedia unit 130 may also be included in the controller 160.

Figure 5:
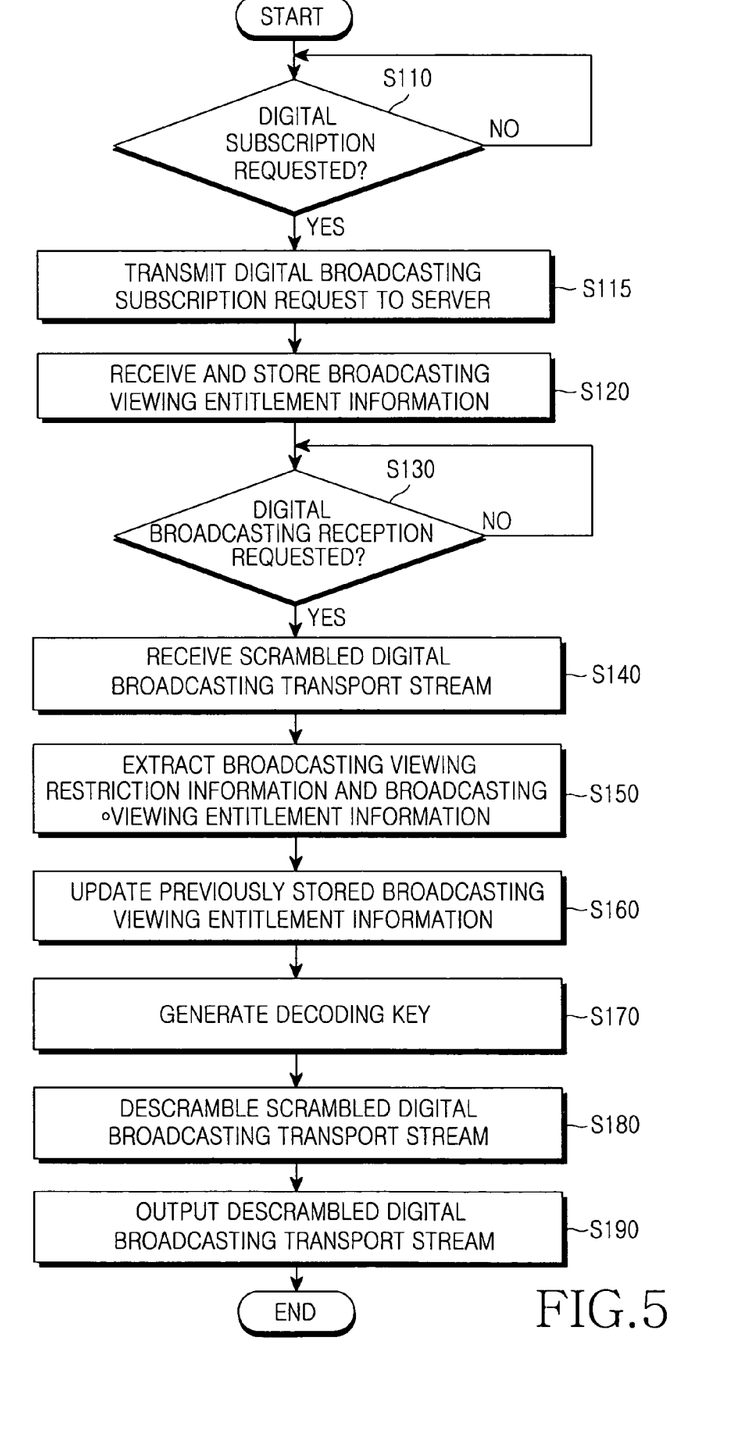
FIG. 5 is a flowchart illustrating an operation of a mobile communication terminal according to the present invention.

FIG. 5 shows an operation of the mobile communication terminal 100 according to the present invention. The mobile communication terminal 100 checks if a user of the mobile communication terminal 100 requests subscription for digital broadcasting in step S110. The request indicates requesting broadcasting viewing entitlement information enabling the user to view broadcasting of digital broadcasting channels or specific digital broadcasting. The broadcasting viewing entitlement information means an Entitlement Management Message (EMM).

Upon request from the user, the mobile communication terminal 100 transmits a request for digital broadcasting subscription to a separate server (e.g., an OTA server) in step S115. The mobile communication terminal 100 transmits subscriber information to the server using an SMS message or the wireless Internet.

The mobile communication terminal 100 receives the broadcasting viewing entitlement information transmitted from the server after authentication of the request and stores the received broadcasting viewing entitlement information in step S120.

The mobile communication terminal 100 checks if the user requests digital broadcasting reception in step S130. The user may request digital broadcasting reception by inputting a hot key preset for digital broadcasting reception or using a menu. The hot key may be one of keys included in the mobile communication terminal 100 or may be separately provided.

If the user requests digital broadcasting reception, the mobile communication terminal 100 switches an operation mode into a digital broadcasting reception mode and receives a scrambled broadcasting signal in step S140.

The mobile communication terminal 100 extracts broadcasting viewing restriction information and broadcasting viewing entitlement information from the scrambled digital broadcasting transport stream in step S150. The broadcasting viewing restriction information indicates an Entitlement Control Message (ECM).

The mobile communication terminal 100 extracts the broadcasting viewing restriction information and broadcasting viewing entitlement information included in the scrambled digital broadcasting transport stream as follows.

In the case of terrestrial digital broadcasting, a broadcasting frame includes a Main Service Channel (MSC) including broadcasting data and a Fast Information Channel (FIC) indicating information of the MSC. The MSC includes multiple sub-channels (e.g., 0-63 sub-channels) including video, audio, and data channels. Since the broadcasting viewing entitlement information and the broadcasting viewing restriction information are included in the FIC or a predetermined sub-channel (e.g., a $64^{th}$ sub-channel) among the 64 sub-channels for transmission, the mobile communication terminal 100 can extract the broadcasting viewing entitlement information and the broadcasting viewing restriction information by checking the FIC or the predetermined sub-channel of the scrambled digital broadcasting transport stream.

The mobile communication terminal 100 updates previously stored broadcasting viewing entitlement information using the extracted broadcasting viewing entitlement information in step S160.

The mobile communication terminal 100 generates a decoding key using the updated broadcasting viewing entitlement information and the extracted broadcasting viewing restriction information in step S170.

The mobile communication terminal 100 descrambles the scrambled digital broadcasting transport stream using the generated decoding key in step S180.

The mobile communication terminal 100 outputs the descrambled digital broadcasting transport stream in step S190.

As described above, according to the present invention, a mobile communication terminal for efficient digital broadcasting conditional access and a method of the mobile communication terminal can be provided.

Moreover, according to the present invention, an appropriate conditional access system can be implemented by providing a mobile communication terminal having a smart card for efficient digital broadcasting conditional access and a method of the mobile communication terminal.

While the present invention has been shown and described with reference to preferred embodiments thereof, it will be understood by those skilled in the art that various changes in form and details may be made therein without departing from the spirit and scope of the invention.

What is claimed is:
1. A mobile communication terminal, comprising:
a Radio Frequency (RF) transceiver for wirelessly receiving from a separate server broadcasting viewing entitlement information indicating whether a user of the mobile communication terminal is entitled to view digital broadcasting;
a digital broadcasting receiver for wirelessly receiving a scrambled digital broadcasting transport stream;
a multimedia unit for extracting from the scrambled digital broadcasting transport stream broadcasting viewing restriction information and broadcasting viewing entitlement information, and descrambling the scrambled digital broadcasting transport stream using a decoding key;
a smart card unit for generating the decoding key for descrambling the scrambled digital broadcasting transport stream, using the digital broadcasting viewing restriction information and the digital broadcasting viewing entitlement information; and
a controller for transmitting to the smart card unit the broadcasting viewing restriction information and broadcasting viewing entitlement information extracted by the multimedia unit in a digital broadcasting reception mode to control the smart card unit to generate the decoding key, and transmitting to the multimedia unit the decoding key generated by the smart card unit.

2. The mobile communication terminal of claim 1, wherein the broadcasting viewing entitlement information is an Entitlement Management Message (EMM) and the broadcasting viewing restriction information is an Entitlement Control Message (ECM).

3. The mobile communication terminal of claim 1, wherein the separate server is an Over-The-Air activation server.

4. The mobile communication terminal of claim 3, further comprising a key input unit through which a digital broadcasting subscription is requested for receiving the broadcasting viewing entitlement information.

5. The mobile communication terminal of claim 4, wherein the controller performs controlling so the RF transceiver transmits a request for a digital broadcasting subscription to the server using a Short Message Service message or a wireless Internet when the user requests a digital broadcasting subscription through the key input unit.

6. The mobile communication terminal of claim 1, wherein the controller performs controlling so the broadcasting viewing entitlement information received by the RF transceiver is stored in the smart card unit.

7. The mobile communication terminal of claim 6, wherein the controller updates the stored broadcasting viewing entitlement information using the broadcasting viewing entitlement information extracted by the multimedia unit and generates the decoding key using the extracted broadcasting viewing restriction information and the updated broadcasting viewing entitlement information.

8. The mobile communication terminal of claim 6, wherein the smart card unit updates previously stored broadcasting viewing entitlement information using the transmitted broadcasting viewing entitlement information and generates the decoding key using the transmitted broadcasting viewing restriction information and the updated broadcasting viewing entitlement information when the broadcasting viewing restriction information and the broadcasting viewing entitlement information extracted by the multimedia unit are transmitted.

9. The mobile communication terminal of claim 1, further comprising a memory for storing the broadcasting viewing entitlement information received from the separate server under control of the controller.

10. The mobile communication terminal of claim 9, wherein the controller updates the stored broadcasting viewing entitlement information using the broadcasting viewing entitlement information extracted by the multimedia unit and generates the decoding key using the extracted broadcasting viewing restriction information and the updated broadcasting viewing entitlement information.

11. The mobile communication terminal of claim 1, wherein the multimedia unit comprises:
   a filter for extracting from the scrambled digital broadcasting transport stream the broadcasting viewing restriction information and broadcasting viewing entitlement information corresponding to the mobile communication terminal;
   a manager for transmitting the extracted broadcasting viewing restriction information and broadcasting viewing entitlement information to the smart card unit under control of the controller and receiving the decoding key generated by the smart card unit; and
   a descrambler for descrambling the scrambled digital broadcasting transport stream using the decoding key transmitted to the manager.

12. The mobile communication terminal of claim 11, wherein the manager simultaneously transmits broadcasting viewing restriction information received at intervals of a first time as being included in the digital broadcasting transport stream and broadcasting viewing entitlement information received at intervals of a second time that is greater than the first time as being included in the digital broadcasting transport stream to the smart card unit.

13. A mobile communication terminal having a smart card, the mobile communication terminal comprising:
   a Radio Frequency (RF) transceiver for wirelessly receiving from a separate server broadcasting viewing entitlement information indicating whether a user of the mobile communication terminal is entitled to view digital broadcasting
   a digital broadcasting receiver for wirelessly receiving a scrambled digital broadcasting transport stream;
   a multimedia unit for extracting from the scrambled digital broadcasting transport stream broadcasting viewing restriction information and broadcasting viewing entitlement information, and descrambling the scrambled digital broadcasting transport stream using a decoding key; and
   a decoding key generator for generating a decoding key for descrambling the scrambled digital broadcasting transport stream, using the digital broadcasting viewing restriction information and the digital broadcasting view entitlement information;
   a controller for transmitting to the decoding key generator the broadcasting viewing restriction information and broadcasting viewing entitlement information extracted by the multimedia unit in a digital broadcasting reception mode to control the decoding key generator to generate the decoding key, and transmitting to the multimedia unit the decoding key generated by the decoding key generator.

14. The mobile communication terminal of claim 13, wherein the broadcasting viewing entitlement information is an Entitlement Management Message (EMM) and the broadcasting viewing restriction information is an Entitlement Control Message (ECM).

15. The mobile communication terminal of claim 13, wherein the separate server is an Over-The-Air activation server.

16. The mobile communication terminal of claim 15, further comprising a key input unit through which digital broadcasting subscription is requested for receiving the broadcasting viewing entitlement information.

17. The mobile communication terminal of claim 16, wherein the controller performs controlling so the RF transceiver transmits a request for digital broadcasting subscription to the server using a Short Message Service message or a wireless Internet when the user requests digital broadcasting subscription through the key input unit.

18. The mobile communication terminal of claim 13, wherein the controller performs controlling so the broadcasting viewing entitlement information received by the RF transceiver is stored in the smart card.

19. The mobile communication terminal of claim 18, wherein the controller transmits the broadcasting viewing entitlement information stored in the smart card to the decoding key generator upon receiving the scrambled digital broadcasting transport stream.

20. The mobile communication terminal of claim 19, wherein the decoding key generator generates the broadcasting viewing entitlement information stored in the smart card using the broadcasting viewing entitlement information extracted by the multimedia unit and generates the decoding key using the extracted broadcasting viewing restriction information and the updated broadcasting viewing entitlement information when the broadcasting viewing entitlement information stored in the smart card is transmitted.

21. The mobile communication terminal of claim 13, wherein the multimedia unit comprises:
   a filter for extracting from the scrambled digital broadcasting transport stream the broadcasting viewing restriction information and broadcasting viewing entitlement information corresponding to the mobile communication terminal;
   a manager for transmitting the extracted broadcasting viewing restriction information and broadcasting viewing entitlement information to the decoding key generator under control of the controller and receiving the decoding key generated by the decoding key generator; and a descrambler for descrambling the scrambled digital broadcasting transport stream using the decoding key transmitted to the manager.

22. The mobile communication terminal of claim 21, wherein the manager simultaneously transmits broadcasting viewing restriction information received at intervals of a first time as being included in the digital broadcasting transport stream and broadcasting viewing entitlement information received at intervals of a second time that is greater than the first time as being included in the digital broadcasting transport stream to the decoding key generator.

23. The mobile communication terminal of claim 13, wherein the decoding key generator is included in the multimedia unit.

24. The mobile communication terminal of claim 13, wherein the decoding key generator is included in the controller.

25. The mobile communication terminal of claim 13, wherein the decoding key generator is included in the smart card.

26. A digital broadcasting conditional access method of a mobile communication terminal, the digital broadcasting conditional access method comprising the steps of:

transmitting wirelessly to a separate server, by a Radio Frequency (RF) Transceiver a request for a digital broadcasting subscription at a request of a user;

receiving, by the RF transceiver, broadcasting viewing entitlement information indicating whether the user of the mobile communication terminal is entitled to view digital broadcasting from the server responding to the request and storing the received broadcasting viewing entitlement information;

extracting broadcasting viewing restriction information and broadcasting viewing entitlement information included in the received digital broadcasting transport stream upon receiving a scrambled digital broadcasting transport stream by a digital broadcasting receiver in a digital broadcasting reception mode;

generating a decoding key for descrambling the scrambled digital broadcasting transport stream using the extracted broadcasting viewing restriction information and the stored broadcasting viewing entitlement information; and descrambling the scrambled digital broadcasting transport stream using the generated decoding key.

27. The digital broadcasting conditional access method of claim 26, wherein the broadcasting viewing entitlement information is an Entitlement Management Message (EMM) and the broadcasting viewing restriction information is an Entitlement Control Message (ECM).

28. The digital broadcasting conditional access method of claim 26, wherein the step of transmitting the request comprises transmitting a request for digital broadcasting subscription to the server using a Short Message Service message or a wireless Internet at the request of the user.

29. The digital broadcasting conditional access method of claim 28, wherein the server is an Over-The-Air activation (OTA) server.

30. The digital broadcasting conditional access method of claim 26, wherein the server is an Over-The-Air activation server.

31. The digital broadcasting conditional access method of claim 26, wherein the step of generating the decoding key comprises:

updating the stored broadcasting viewing entitlement information using the extracted broadcasting viewing entitlement information; and generating the decoding key using the extracted broadcasting viewing restriction information and the updated broadcasting viewing entitlement information.

32. The digital broadcasting conditional access method of claim 26, further comprising decoding and then outputting the descrambled digital broadcasting transport stream.

* * * * *